United States Patent [19]

Mize

[11] Patent Number: 5,129,334

[45] Date of Patent: Jul. 14, 1992

[54] AGGREGATE DRYER AND SOIL INCINERATOR HAVING LOW NOX EMISSIONS

[75] Inventor: E. Gail Mize, Chattanooga, Tenn.

[73] Assignee: Astec Industries, Inc., Chattanooga, Tenn.

[21] Appl. No.: 668,305

[22] Filed: Mar. 13, 1991

[51] Int. Cl.⁵ .......................... F27B 7/38; F27B 17/02
[52] U.S. Cl. ...................................... 110/246; 432/106
[58] Field of Search ................ 110/246; 432/105, 106, 432/107, 111, 117, 118

[56] References Cited

U.S. PATENT DOCUMENTS

| | | |
|---|---|---|
| 1,835,147 | 12/1931 | Drew . |
| 2,094,152 | 9/1937 | Granger . |
| 2,139,419 | 12/1938 | Moreton . |
| 2,182,093 | 12/1939 | Peltz . |
| 2,240,702 | 5/1941 | King . |
| 3,780,676 | 12/1973 | Hazzard et al. . |
| 3,799,075 | 3/1974 | Hazzard et al. . |
| 3,834,862 | 9/1974 | Eliason ................... 432/106 |
| 3,862,609 | 1/1975 | Eff . |
| 3,955,917 | 5/1976 | Kratochvil ............... 432/106 |
| 3,974,572 | 8/1976 | Cerles et al. ............ 432/107 |
| 4,066,024 | 1/1978 | O'Connor . |
| 4,260,369 | 4/1981 | Warshawsky .......... 432/106 |
| 4,399,756 | 8/1983 | Lientz . |
| 4,453,474 | 6/1984 | Lewis . |
| 4,495,872 | 1/1985 | Shigaki . |
| 4,555,182 | 11/1985 | Mandenhall ........... 432/106 |
| 4,592,289 | 6/1986 | Pershing et al. . |
| 4,670,054 | 6/1987 | Hohman et al. ........ 432/106 |
| 4,681,262 | 8/1989 | Gitman et al. . |
| 4,782,766 | 11/1988 | Lee et al. . |
| 4,870,912 | 10/1989 | Lee . |
| 4,890,563 | 1/1990 | White et al. ............ 432/106 |

Primary Examiner—Henry C. Yuen
Attorney, Agent, or Firm—Bell, Seltzer, Park & Gibson

[57] ABSTRACT

An apparatus is disclosed for heating and drying stone aggregate useful in the production of asphalt, and which also has the ability to incinerate contaminated soil. The apparatus includes a rotary drum dryer for heating and drying the aggregate, and a rotary incinerator for incinerating the soil. The discharge ends of the rotary dryer and incinerator are positioned so as to oppose each other, and a breeching is provided for enclosing and interconnecting the two ends. The breeching includes a diverter gate, so that the incinerated soil may be either added to the heated and dried aggregate, or directed to a separate external stockpile. The incinerator has a refractory lined interior having a plurality of air inlet tuyeres which are spaced along its axial length so as to provide for the staged combustion of the volatilized contaminants in the soil, to thereby result in low NOx emissions.

10 Claims, 3 Drawing Sheets

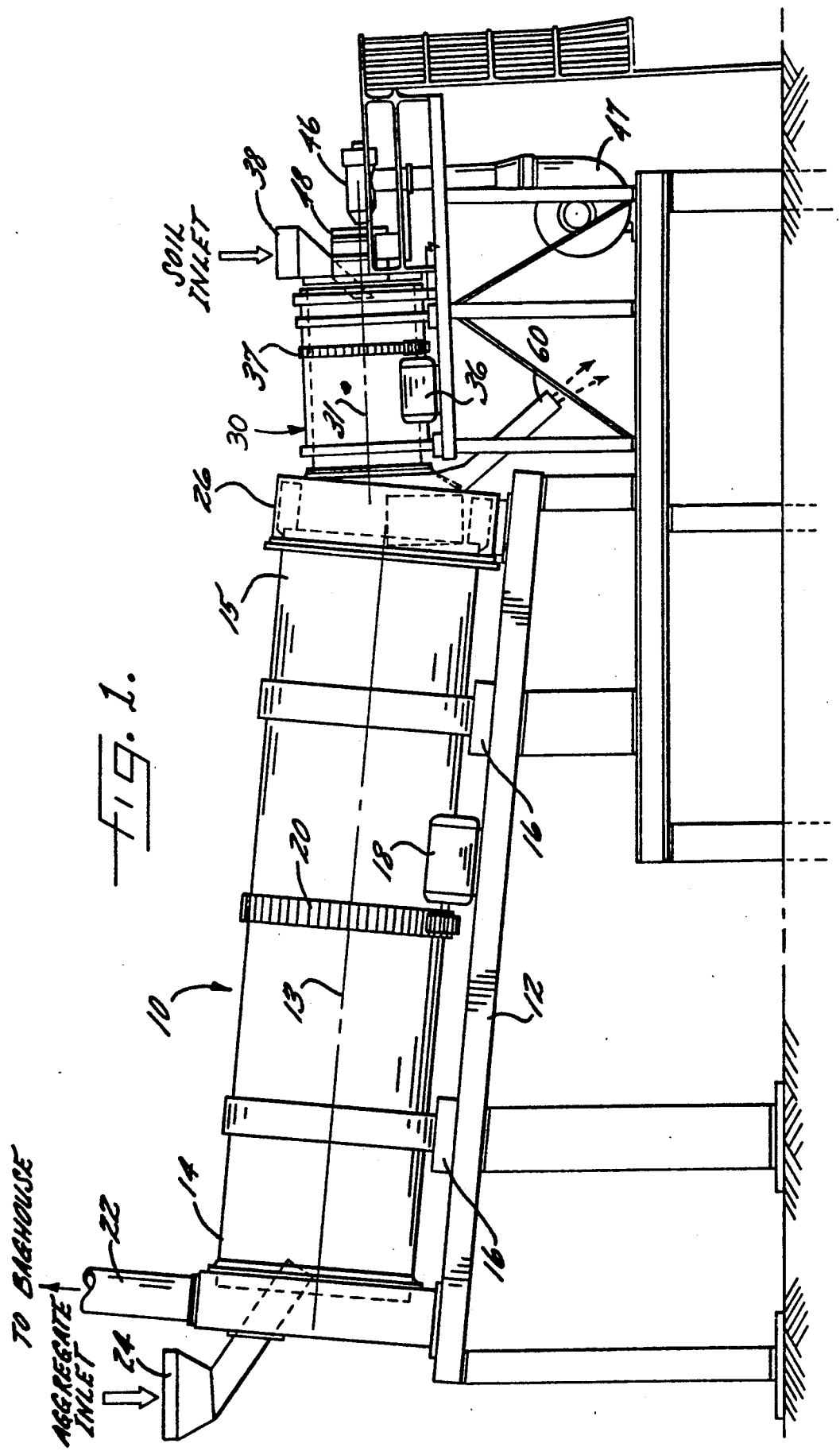

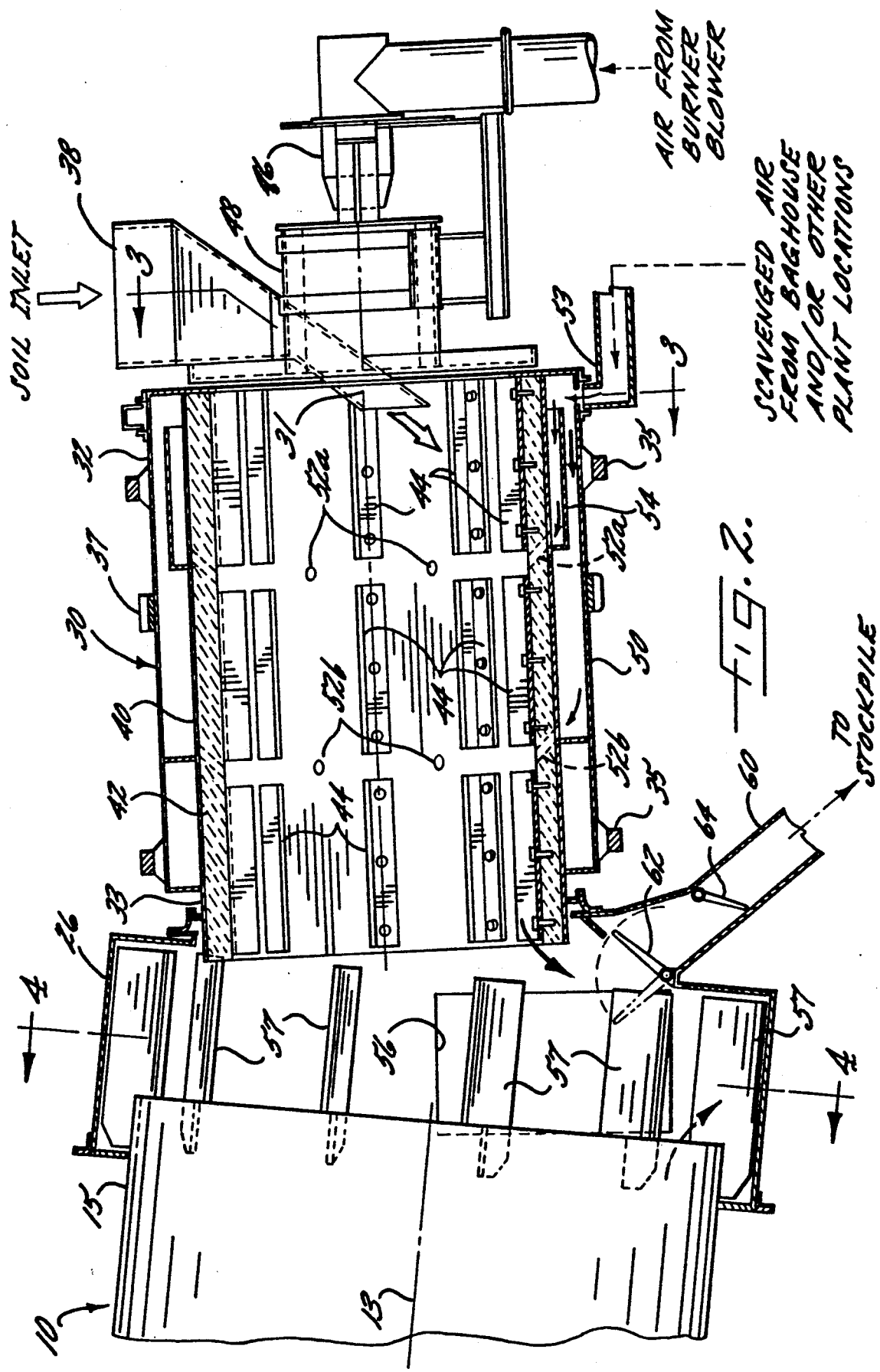

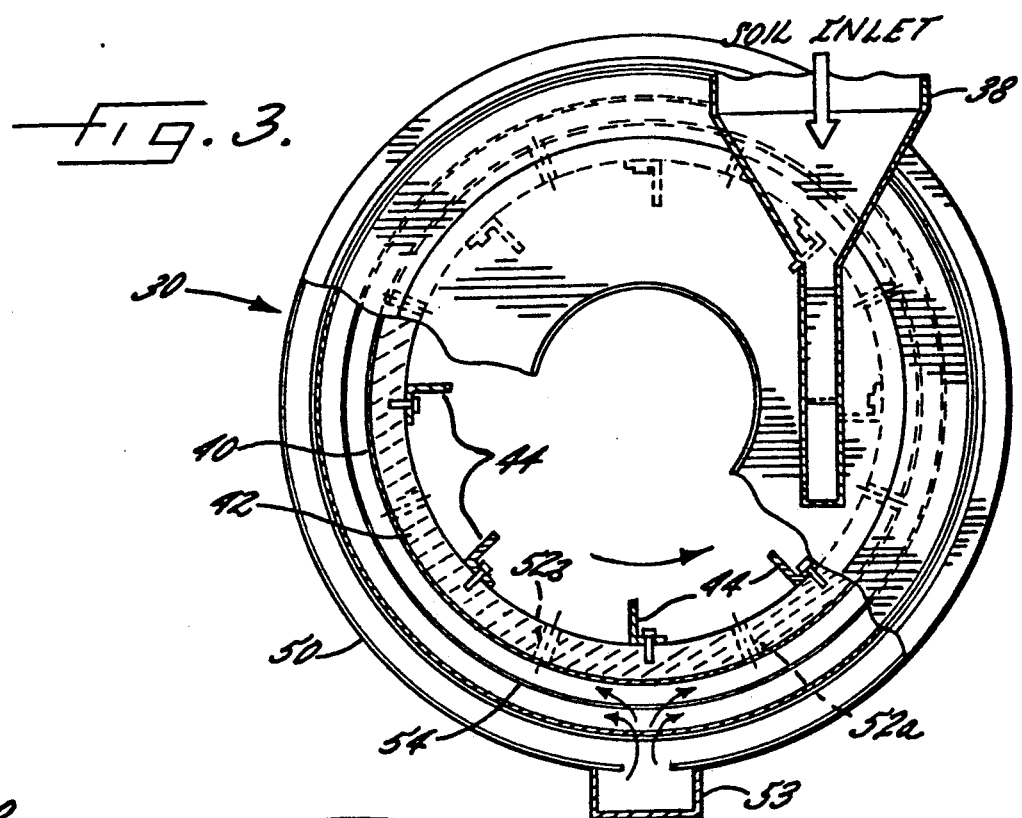
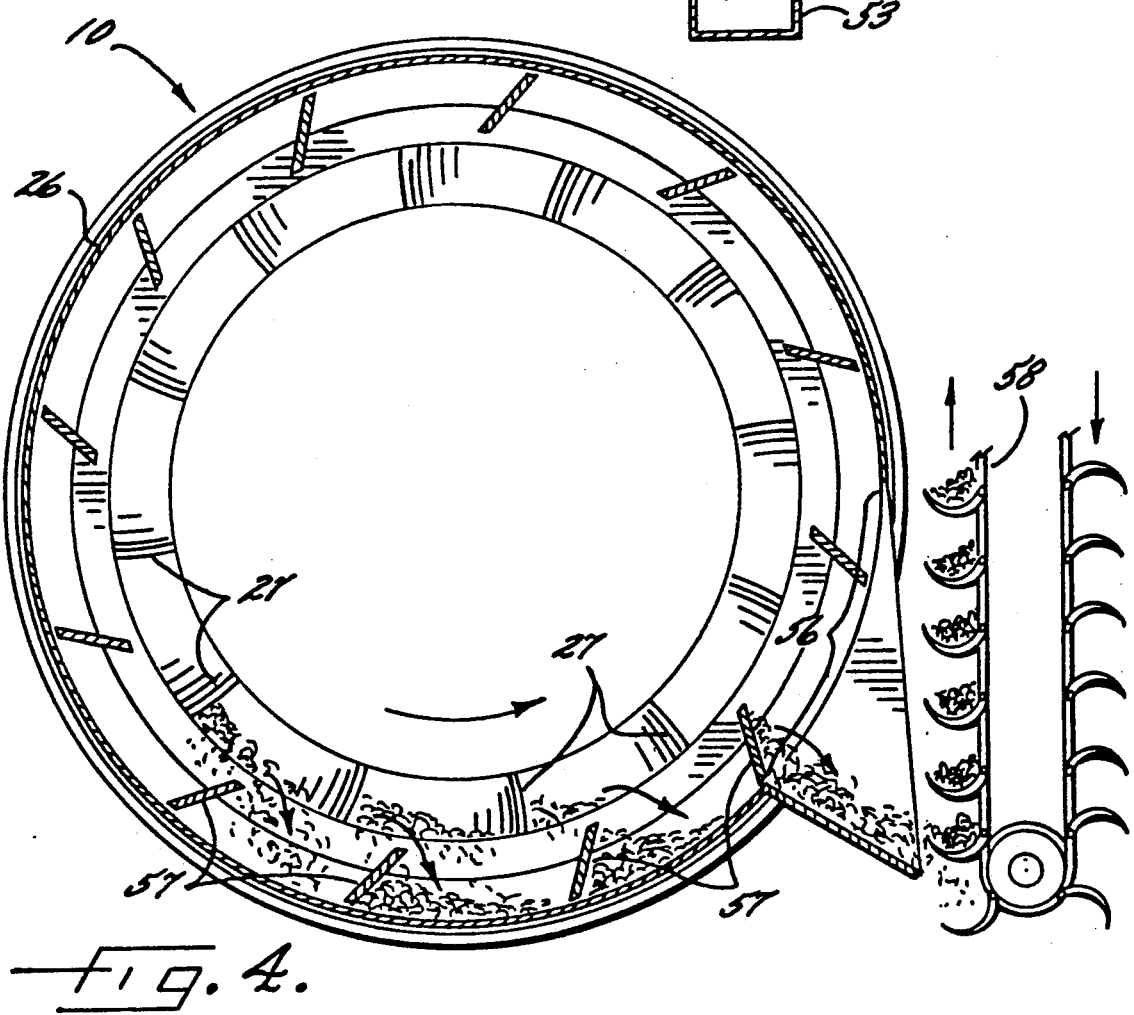

AGGREGATE DRYER AND SOIL INCINERATOR HAVING LOW NOX EMISSIONS

BACKGROUND OF THE INVENTION

The present invention relates to an apparatus for continuously heating and drying stone aggregate useful in the production of asphalt paving composition or the like, and which also has the ability to incinerate contaminated soil under environmentally acceptable conditions.

The effective cleanup and disposal of soils which are contaminated with petroleum products and other contaminants have recently become major environmental concerns. As one specific example of the problem, a large number of underground fuel tanks have been found to be leaking and releasing a variety of contaminants into the surrounding soil, and as these tanks are being removed and repaired pursuant to environmental regulations, the volume of contaminated soil has been growing. Many communities no longer permit such soil to be placed in landfills, and thus a need exits for the decontamination of the soils.

Copending and commonly owned application Ser. No. 07/565,945 discloses an apparatus for efficiently decontaminating soil, and which has several common components with a conventional asphalt production plant. This feature permits a conventional asphalt plant to be retrofitted by the addition of a relatively small number of additional components, so as to permit the apparatus to selectively produce asphalt, or to decontaminate soil.

Another known design for a soil decontamination apparatus which is utilized in combination with several of the components of a conventional asphalt plant, comprises a drum dryer for heating aggregate in the conventional manner, and which includes a discharge end which is enclosed by a breeching for conveying the heated material to an external conveyor. A rotary soil incinerator is mounted adjacent the discharge end of the drum dryer, and the incinerator includes a discharge end which communicates with the breeching so that the incinerated soil may be discharged into the breeching and mixed with the heated aggregate. This system has proven to be very satisfactory, but problems remain by reason of the fact that the incineration of the soil produces unacceptably high levels of harmful NOx gases, which exit with the exhaust of the drum dryer.

Copending and commonly owned application entitled "Aggregate Dryer For Use With Asphalt Plant Having Reduced NOx Emissions", Ser. No. 07/633,334, filed Dec. 27, 1990, discloses a rotary dryer for heating aggregate in an asphalt plant, and which includes a recirculation system for recirculating gases into the downstream end of the gas burner for the purpose of reducing NOx emissions. However, this prior system is not seen to be applicable to the problem associated with the emission of NOx gases in an apparatus comprising a drum dryer and soil incinerator of the type described above.

It is accordingly an object of the present invention to provide an apparatus for decontaminating soil which may be used in conjunction with a drum dryer of an otherwise conventional asphalt plant, and which effectively reduces the release of harmful NOx gases.

It is a further object of the present invention to provide an apparatus of the described type wherein the incinerated soil may be selectively added to the heated and dried aggregate as it is discharged from the drum dryer, or directed to a separate external conveyor for stockpiling or other use.

Another object of the present invention is to provide an apparatus of the described type which includes provision for incinerating any volatile hydrocarbons contained in air scavenged from various locations of the asphalt plant.

SUMMARY OF THE INVENTION

The above and other objects and advantages of the present invention are achieved in the embodiment illustrated herein by the provision of an apparatus which comprises a rotary drum having an aggregate entry end, an opposite discharge end for discharging the aggregate therefrom, and an air exhaust duct adjacent the entry end. The drum is rotated by a drive motor so as to convey aggregate therethrough in a cascading fashion as the drum rotates. A rotary incinerator is provided for incinerating a second material, such as contaminated soil, and the incinerator includes a material entry end, a gas burner mounted adjacent the material entry end, an opposite material discharge end, and a drive motor for rotating the incinerator so as to convey the material therethrough as the incinerator rotates. Also, means are provided for delivering air into the interior of the incinerator at spaced apart locations along the axial length thereof during rotation of the incinerator.

The apparatus also includes breeching means which encloses and interconnects the discharge end of the rotary drum and the discharge end of the rotary incinerator, and which is positioned such that any aggregate discharged through the discharge end of the drum and any incinerated material discharged through the discharge end the rotary incinerator is received therein. Also, the gases heated by the burner pass into the drum and exhaust through the air exhaust duct, and means are provided for removing any aggregate or material received in the breeching means to an external location.

In a preferred embodiment, a diverter gate is positioned in the breeching so that the incinerated soil may be selectively mixed with the aggregate from the dryer. Also, the air delivered into the interior of the incinerator as described above may be supplied by air scavenged from other components of the plant, such as from a silo vent or an air cleaning baghouse, so as to incinerate any volatile hydrocarbons or other contaminants contained in the scavenged air.

The above construction provides for the staged combustion of the contaminated soil in the combustion chamber so as to minimize the production of NOx. Also, when incorporated as part of an otherwise conventional asphalt plant, the novel construction permits selected amounts of the incinerated soil to be mixed with the aggregate and thereby incorporated in the resulting asphalt, or the incinerated soil can be diverted to a separate location for other uses.

BRIEF DESCRIPTION OF THE DRAWINGS

Some of the objects and advantages of the present invention having been stated, others will appear as the description proceeds, when taken in conjunction with the accompanying drawings, in which FIG. 1 is a side elevation view of an apparatus which embodies the features of the present invention;

FIG. 2 is a fragmentary, partly sectioned, side elevation view of the incinerator and breeching portions of the apparatus shown in FIG. 1;

FIG. 3 is a end sectional view taken substantially along the line 3—3 of FIG. 2; and FIG. 4 is an end sectional view taken substantially along the line 4—4 of FIG. 2.

DETAILED DESCRIPTION OF THE PREFERRED EMBODIMENT

Referring more particularly to the drawings, FIG. 1 illustrates an apparatus which embodies the features of the present invention and which comprises a component of an otherwise conventional asphalt production plant, as more completely illustrated for example in U.S. Pat. Nos. 4,211,490 and 4,638,747. The apparatus comprises a rotary drum dryer which is in the form of an elongate hollow drum 10, which is rotatably mounted on a support frame 12 so as to define a central axis 13 which is inclined with respect to the horizontal, and to thereby define an upper end 14 and a lower end 15 of a drum.

The drum 10 is rotatably mounted to the support frame by means of bearings 16, and it is rotatably driven by a motor 18 which operatively drives a sprocket 20 which is fixed in encircling relation to the exterior of the drum, with the output of the motor 18 and the sprocket 20 being interconnected with a chain (not shown). An exhaust air duct 22 communicates with the upper end 14 of the drum dryer, and in a typical asphalt production plant, the air duct 22 leads to a baghouse and exhaust blower, with the air then being released to the atmosphere.

An aggregate inlet 24 is positioned adjacent the upper end 14 of the drum for introducing aggregate into the interior of the drum while it is rotating about the central axis 13. Also, the opposite or lower end 15 of the drum defines an aggregate outlet which opens into an enclosing breeching 26. The interior of the drum also incorporates baffles or flights 27 (FIG. 4) of conventional design, and as disclosed for example, in U.S. Pat. No. 4,332,478, for causing the aggregate which is introduced through the inlet 24 to cascade through the interior of the drum and move to the outlet as the drum rotates.

The apparatus of the present invention further comprises a rotary incinerator 30 which defines a rotational axis 31 which is inclined with respect to the horizontal in a direction opposite that of the central axis 13. The rotary incinerator 30 thus includes an upper end 32 and a lower end 33. Also, the incinerator 30 is mounted for rotation about the rotational axis 31 by means of bearings 35, and a motor 36 and encircling chain/sprocket 37 are provided for rotating the incinerator about the rotational axis. A soil inlet 38 is positioned adjacent the upper end 32 of the incinerator for introducing the material to be incinerated into the interior of the incinerator while it is rotating about the rotational axis, and the opposite or lower end 33 of the incinerator defines a material outlet for withdrawing the material from the interior of the incinerator while it is rotating.

As best seen in FIG. 2, the rotary incinerator comprises a hollow cylinder 40 having a refractory lining 42, and the incinerator further comprises a plurality of flights 44 mounted to the interior of the refractory lining so as to lift and cascade the material passing therethrough during rotation of the incinerator. The flights 44 comprise angled bars as illustrated, which are bolted to the refractory lining 42, and the bars may be fabricated from any suitable material, such as stainless steel or a refractory material.

The incinerator 30 further includes a gas burner 46 positioned at the upper end 32 of the incinerator and which receives air from a blower 47, for introducing a heated gas into the interior of the incinerator and such that the heated gas flows through the breeching 26 and then through the drum 10 to the exhaust air duct 22, and then to a baghouse in the conventional manner. The burner 46 is of conventional design, and it acts to spray a jet of oil droplets into a cylindrical combustion chamber 48, where the droplets are vaporized and ignited.

In accordance with the present invention, the incinerator 30 further comprises means for delivering air into the interior of the incinerator at spaced apart locations along the axial length thereof. This air delivery means comprises an air plenum 50 surrounding substantially the full axial length of the cylinder, and a plurality of air holes or tuyeres 52a, 52b extending radially from the plenum through the cylinder 40 and the refractory lining 42. An air inlet 53 communicates with the plenum adjacent the upper end of the incinerator, and in the illustrated embodiment, the tuyeres are positioned so as to define a first row 52a which is positioned adjacent the inlet opening 53, and a second row 52b which is axially spaced from the inlet opening. Also, a baffle 54 is positioned in the plenum between the first and second rows such that a portion of the entering air is conveyed directly to the second row of tuyeres.

The breeching 26 is positioned to enclose and interconnect the lower end 15 of the drum 10 and the lower end 33 of the rotary incinerator 30, and such that any aggregate discharged through the outlet end of the drum and any material discharged through the outlet end of the rotary incinerator is received therein. In order to remove any aggregate or material received in the breeching, the breeching includes a discharge opening 56 through the side wall thereof, and there is provided a plurality of rake-out paddles 57 which are mounted to the drum for sweeping any such aggregate or material received in the breeching through the discharge opening 56 during rotation of the drum. As seen in FIG. 4, the discharge opening 56 preferably communicates with a bucket elevator 58 or the like, for conveying the removed material to a separate location for further processing in accordance with conventional asphalt production techniques, or for stockpiling or other use.

The breeching 26 further mounts a discharge by-pass line 60 which communicates with the interior thereof, and a diverter gate 62 is positioned in the breeching directly below the outlet end of the incinerator for selectively causing any material discharged through the outlet of the rotary incinerator to pass either into the breeching for mixing with the aggregate from the dryer and removal in the manner described above, or into the discharge by-pass line 60. A flop gate 64 is also positioned in the by-pass line 60 to limit the entry of outside air into the breeching.

In operation, the burner 46 is preferably fired with less than the stoichiometric amount of air, so as to reduce the flame temperature and the production of NOx. Additional combustion air and excess air may be admitted through the tuyeres 52a, 52b from the plenum, and this additional air provides for essentially complete staged combustion of all fuel and combustible contaminants in the soil. Preferably, the air fed into the inlet of the plenum is scavenged air from other components of the asphalt production plant, such as a silo or the baghouse, but the scavenged air may be mixed with clean air to assure sufficient oxygen, if necessary. By this procedure, any volatile hydrocarbons contained in the scavenged air will be essentially completely burned in the incinerator. Also, the rotation of the incinerator 30 and the design of the flights 44 promote a cascading or tumbling action which exposes all surfaces of the contaminated soil to the heat of the flame and the surface of the hot refractory lining 42, thus facilitating the volatilization of the contaminants and their combustion.

In the drawings and specification, there has been set forth a preferred embodiment of the invention, and although specific terms are employed, they are used in a generic and descriptive sense only and not for purposes of limitation.

That which is claimed is:

1. An apparatus for heating and drying stone aggregate useful in the production of asphalt paving composition or the like, and which also has the ability to incinerate a second material such as contaminated soil under conditions so as to result in low NOx emissions, and to add the incinerated second material to the heated and dried aggregate, and comprising a rotary drum having an aggregate entry end, an opposite discharge end for discharging the aggregate therefrom, an air exhaust duct adjacent said entry end, and means for rotating said drum so as to convey aggregate therethrough in a cascading fashion as the drum rotates, a rotary incinerator for incinerating a second material, and including a material entry end, a burner mounted adjacent said material entry end, an opposite material discharge end, means for rotating said incinerator so as to convey the material therethrough as the incinerator rotates, and means for delivering air into the interior of said incinerator at spaced apart locations along the axial length thereof during rotation of said incinerator, breeching means enclosing and interconnecting the discharge end of said rotary drum and the discharge end of said rotary incinerator and positioned such that any aggregate discharged through said discharge end of said drum and any incinerated material discharged through said discharge end said rotary incinerator is received therein, and such that the gasses heated by said burner pass into said drum and exhaust through said air exhaust duct, and means for removing any aggregate or material received in said breeching means to an external location.

2. The apparatus as defined in claim 1 wherein said rotary incinerator comprises a cylinder having a refractory lining.

3. The apparatus as defined in claim 2 wherein said rotary incinerator further comprises a plurality of flights mounted to the interior of said refractory lining so as to lift and cascade the material passing therethrough during rotation of said incinerator.

4. The apparatus as defined in claim 3 wherein said removing means comprises a discharge opening in said breeching and communicating with the interior thereof, and rake-out paddle means mounted to said drum for sweeping any aggregate or material received in said breeching means through said discharge opening during rotation of said drum.

5. The apparatus as defined in claim 3 wherein said means for delivering air into the interior of said incinerator comprises an air plenum surrounding at least a substantial portion of the length of said cylinder, and a plurality of tuyeres extending radially from said plenum through said cylinder and refractory lining.

6. The apparatus as defined in claim 5 wherein said means for delivering air into the interior of said incinerator further comprises an air inlet to said plenum adjacent said material inlet end of said incinerator, a first plurality of tuyeres positioned adjacent said inlet opening, a second plurality of tuyeres positioned to be axially spaced from said inlet opening, and baffle means mounted in said plenum for directing a portion of the air entering through said air inlet directly to said second plurality of tuyeres.

7. The apparatus as defined in claim 6 wherein said breeching means further includes a discharge by-pass line communicating with the interior thereof, and said apparatus further comprises diverter gate means positioned in said breeching means for selectively delivering any material discharged from said discharge end of said rotary incinerator either into said breeching means or into said discharge by-pass line.

8. An apparatus for heating and drying stone aggregate useful in the production of asphalt paving composition or the like, and which also has the ability to incinerate a second material such as contaminated soil under conditions so as to result in low NOx emissions, and to add the incinerated second material to the heated aggregate, and comprising an elongate hollow drum defining a central axis, with said central axis being inclined with respect to the horizontal so as to define an upper end and a lower end of said drum, means mounting said drum for rotation about said central axis, aggregate inlet means positioned adjacent said upper end of said drum for introducing aggregate into the interior of said drum while it is rotating about said central axis, aggregate outlet means positioned adjacent said lower end of said drum for withdrawing the aggregate from the interior of said drum while it is rotating about said central axis, exhaust air duct means positioned adjacent said upper end of said drum, means for rotating said drum about said central axis so as to cause the aggregate which is introduced at said inlet means to cascade through the interior of said drum and move to said outlet means, a refractory lined rotary incinerator defining a rotational axis, with said rotational axis being inclined with respect to the horizontal so as to define an upper end and a lower end of said incinerator, and means for delivering air into the interior of said incinerator at spaced apart locations along the axial length thereof, means mounting said rotary incinerator for rotation about said rotational axis, material inlet means positioned adjacent said upper end of said rotary incinerator for introducing a material to be incinerated into the interior of said incinerator while it is rotating about said rotational axis, material outlet means positioned adjacent said lower end of said incinerator for withdrawing the material from the interior of said incinerator while it is rotating about said rotational axis, means for rotating said rotary incinerator about said rotational axis so as to cause the material which is introduced at said inlet means to cascade through the interior of said rotary incinerator and move to said outlet means, breeching means enclosing and interconnecting the lower end of said drum and the lower end of said rotary incinerator and positioned such that any aggregate discharged through said outlet means of said drum and any material discharged through said outlet means of said rotary incinerator is received therein, burner means positioned at said upper end of said rotary incinerator for introducing a heated gas into the interior of said rotary incinerator and such that the heated gas flows through said breeching means and then through said drum to said exhaust air duct means, and means for removing any aggregate or material received in said breeching means therefrom.

9. The apparatus as defined in claim 8 wherein said breeching means further includes a discharge by-pass line communicating with the interior thereof, and said apparatus further comprises diverter gate means positioned in said breeching means for selectively delivering any material discharged through said outlet means of said rotary incinerator either into said breeching means or into said discharge by-pass line.

10. The apparatus as defined in claim 9 wherein said removing means comprises a discharge opening communicating with the interior of said breeching, and rake-out paddle means mounted to said drum for sweeping any aggregate or material received in said breeching means through said discharge opening during rotation of said drum.

* * * * *